United States Patent
Ohyama et al.

(10) Patent No.: US 7,659,954 B2
(45) Date of Patent: Feb. 9, 2010

(54) LIQUID CRYSTAL DISPLAY DEVICE, ELECTRONIC EQUIPMENT, AND METHOD OF MANUFACTURING LIQUID CRYSTAL DISPLAY DEVICE

(75) Inventors: Tsuyoshi Ohyama, Tokyo (JP); Masaya Tamaki, Kanagawa (JP); Koji Ishizaki, Tokyo (JP); Setsuo Suzuki, Kanagawa (JP); Motoharu Nishida, Kanagawa (JP); Kotaro Yoneda, Kanagawa (JP); Akira Sakaigawa, Kanagawa (JP); Hidemasa Yamaguchi, Kanagawa (JP); Koji Noguchi, Kanagawa (JP); Masaaki Kabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/743,977

(22) Filed: May 3, 2007

(65) Prior Publication Data

US 2008/0174722 A1    Jul. 24, 2008

(30) Foreign Application Priority Data

May 9, 2006    (JP) .............................. 2006-129830

(51) Int. Cl.
| | |
|---|---|
| *G02F 1/1335* | (2006.01) |
| *G02F 1/1337* | (2006.01) |
| *G02F 1/1339* | (2006.01) |
| *G02F 1/1341* | (2006.01) |
| *G02F 1/1347* | (2006.01) |

(52) U.S. Cl. .................. 349/117; 349/75; 349/119; 349/121; 349/123; 349/189; 349/190

(58) Field of Classification Search ................. 349/75, 349/117, 121, 189, 190, 119, 123
See application file for complete search history.

(56) References Cited

U.S. PATENT DOCUMENTS

| 5,602,661 | A  * | 2/1997  | Schadt et al.   | 349/124 |
| 7,258,903 | B2 * | 8/2007  | Francis et al.  | 428/1.1 |
| 2006/0221281 | A1* | 10/2006 | Kobayashi   | 349/117 |
| 2009/0073352 | A1* | 3/2009  | Hamilton et al. | 349/96 |

FOREIGN PATENT DOCUMENTS

| JP | 10-197862   | 7/1998 |
| JP | 2004-118222 | 4/2004 |
| JP | 2004-309598 | 4/2004 |

\* cited by examiner

*Primary Examiner*—Frank G Font
*Assistant Examiner*—Jerry Blevins
(74) *Attorney, Agent, or Firm*—Sonnenschein Nath & Rosenthal LLP

(57) ABSTRACT

A liquid crystal display device of electrically controlled birefringence mode includes the combination of a liquid crystal cell having a liquid crystal layer sandwiched between a pair of substrates, and a hybrid retardation layer in which liquid crystal molecules are hybrid-aligned, and the hybrid retardation layer is formed by deposition at the liquid crystal layer side on one substrate of the pair of substrates.

13 Claims, 15 Drawing Sheets

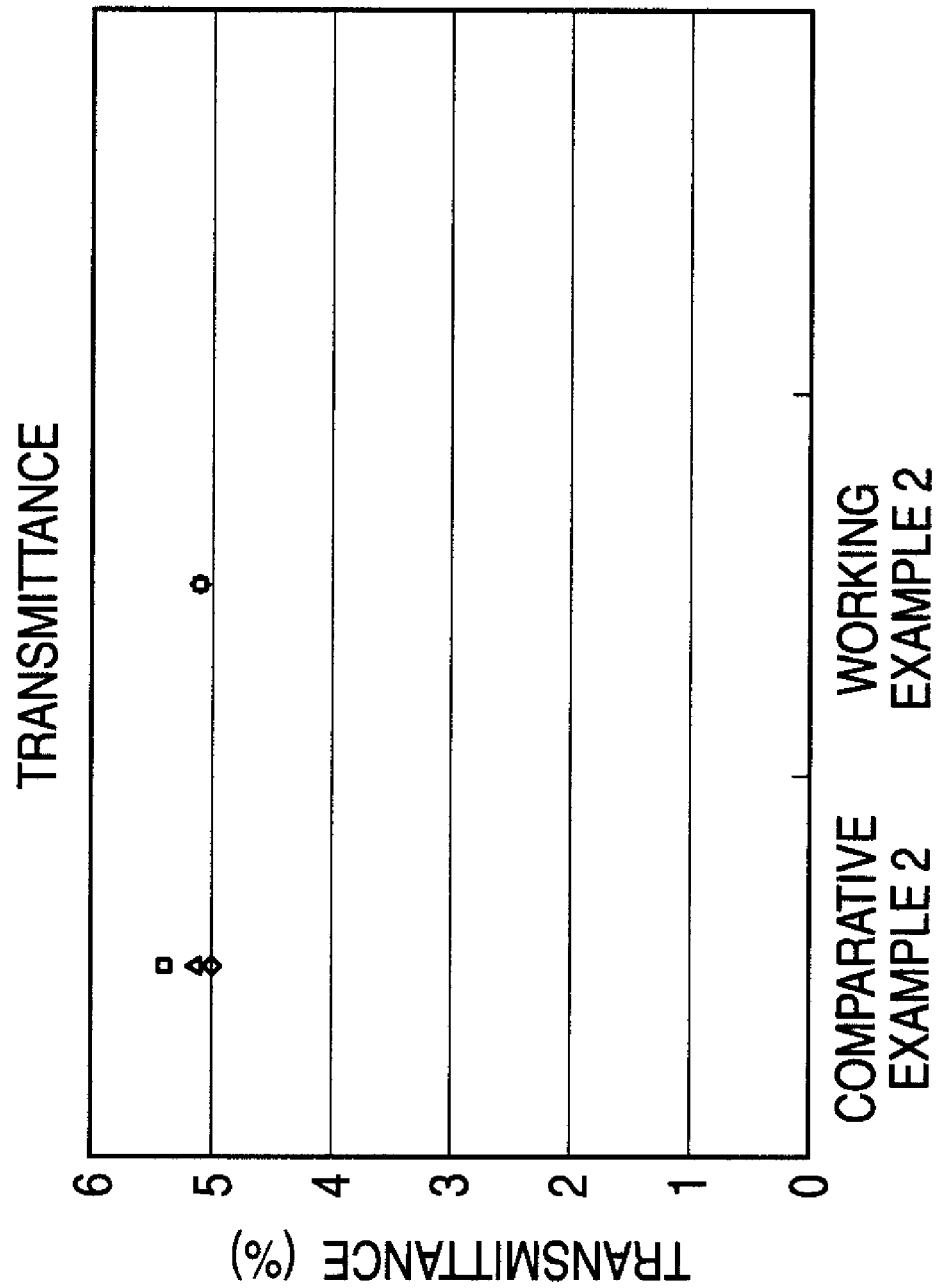

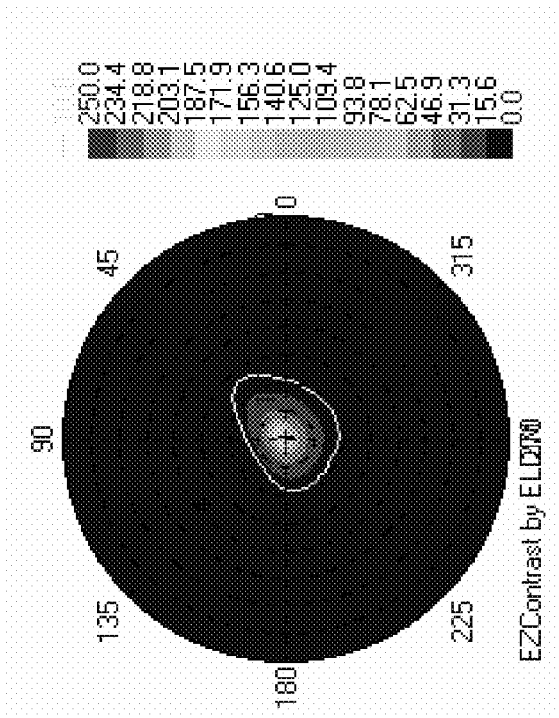
Fig.14 (2)
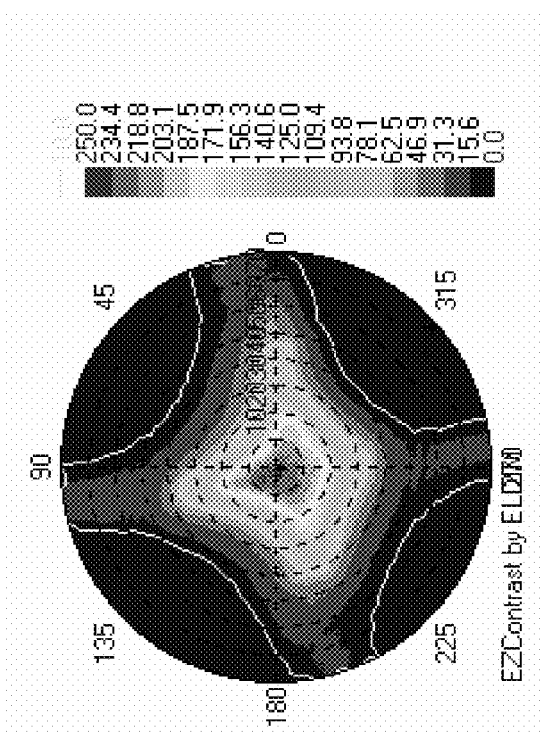
Fig.14 (1)

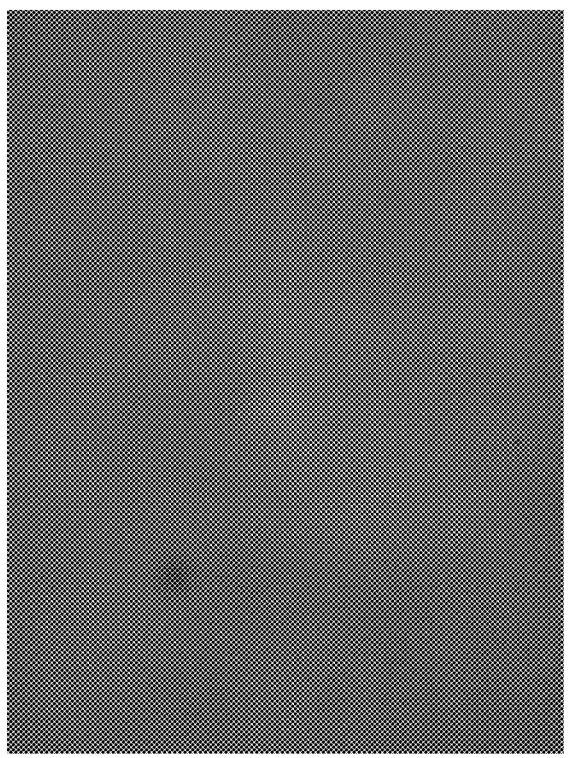
Fig.15 (2)
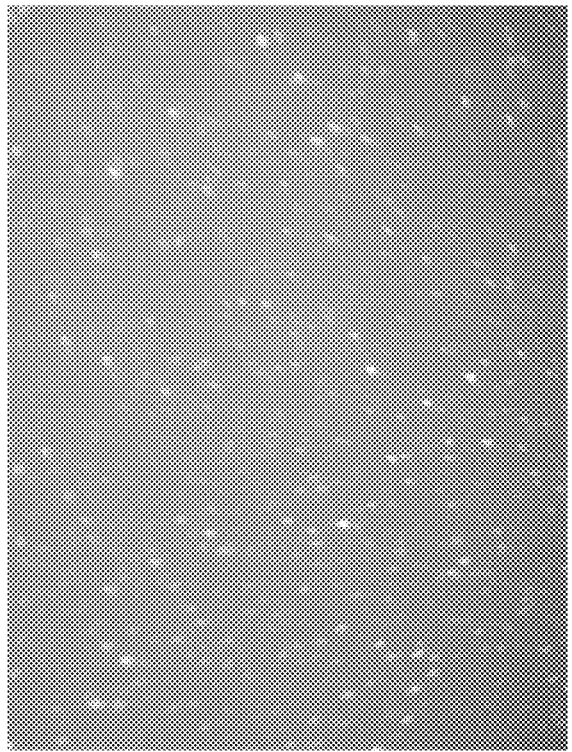
Fig.15 (1)

LIQUID CRYSTAL DISPLAY DEVICE, ELECTRONIC EQUIPMENT, AND METHOD OF MANUFACTURING LIQUID CRYSTAL DISPLAY DEVICE

CROSS REFERENCES TO RELATED APPLICATIONS

The present invention contains subject matter related to Japanese Patent Application JP 2006-129830 filed in the Japanese Patent Office on May 9, 2006, the entire contents of which being incorporated herein by reference.

BACKGROUND OF THE INVENTION

1. Field of the Invention

The present invention relates to a liquid crystal display device of Electrically Controlled Birefringence (ECB) mode having a retardation layer in which liquid crystal molecules are hybrid-aligned, electronic equipment using the device, and a method of manufacturing the liquid crystal display device.

2. Background Art

In related art, as a general drive mode in a liquid crystal display device for personal computers, the twist nematic mode that provides high transmittance and display in simple combination with polarizing plates has been applied. Recently, there has been a sharply increasing demand for display devices for use in mobile electronic equipment such as Personal Digital Assistants (PDAs) or cellular phones, and semi-transmissive liquid crystal display devices that enable lower power consumption and higher visibility outdoors compared to transmissive liquid crystal display devices have been developed.

In the semi-transmissive liquid crystal display devices, generally, the ECB mode in combination with retardation layers is applied. In order to obtain display characteristics of reflection and transmission, the semi-transmissive liquid crystal display device has a configuration in which a liquid crystal cell is sandwiched with one or two retardation layers at one side.

Further, in the liquid crystal display device of ECB mode, a retardation layer having a hybrid structure is used as the retardation layer. Since the combination of the hybrid-structured retardation layer with the ECB mode provides a wide viewing angle, the combination has been applied not only to the semi-transmissive liquid crystal display devices but also to the transmissive liquid crystal display devices these days.

As a liquid crystal display device using the hybrid-structured retardation layer, a configuration in which a liquid crystal cell is sandwiched with hybrid-structured retardation layers having negative refractive anisotropy is proposed (see JP-A-10-197862 (FIG. 1, paragraph 0006) (patent document 1), JP-A-2004-118222 (FIG. 1, paragraph 0045) (patent document 2), and JP-A-2004-309598 (paragraphs 0020, 0052) (patent document 3)).

SUMMARY OF THE INVENTION

In the case where the liquid crystal display device having a liquid crystal cell sandwiched by retardation layers is fabricated, a retardation layer is formed by coating on a film base material and the film base material on which the retardation layer has been formed by coating is bonded to the liquid crystal cell. However, when the hybrid-structured retardation layer is formed by coating on the film base material, it is difficult to obtain good alignment characteristic and uniform retardation characteristic.

In order to avoid the difficulties, a method of forming the hybrid-structured retardation layer directly on the outer surface of a substrate that forms the liquid crystal cell has been also considered. However, in this case, the hybrid-structured retardation layer is easily damaged in the assembly process of the liquid crystal cell and causes deterioration in display characteristic.

Accordingly, it is desirable to provide a liquid crystal display device having a good viewing angle yet high contrast and good display characteristic because of including retardation layers in which liquid crystal molecules are hybrid-aligned, electronic equipment using the device, and a method of manufacturing the liquid crystal display device.

A liquid crystal display device according to an embodiment of the invention is a liquid crystal display device of electrically controlled birefringence mode including the combination of: a liquid crystal cell having a liquid crystal layer sandwiched between a pair of substrates; and a hybrid retardation layer in which liquid crystal molecules are hybrid-aligned, and the hybrid retardation layer is formed by deposition at the liquid crystal layer side on one substrate of the pair of substrates.

Further, electronic equipment according to an embodiment of the invention uses the liquid crystal display device having the above described configuration.

In the liquid crystal display device and the electronic equipment using the device, since the hybrid retardation layer is formed by deposition on the substrate, the alignment of the hybrid retardation layer can be improved and homogeneous retardation characteristic can be obtained.

Further, a method of manufacturing a liquid crystal display device according to an embodiment of the invention includes the steps of: forming a hybrid retardation layer in which liquid crystal molecules are hybrid-aligned on a first substrate; and filling and sealing a space between the first substrate and a second substrate oppositely provided at a formation surface of the hybrid retardation layer on the first substrate with a liquid crystal layer.

In the first method, at the step of forming the hybrid retardation layer by deposition, a material film of the hybrid retardation layer is deposited using light cure liquid crystal via an alignment film on the first substrate, and the material film is exposed to light while viewing angle dependency of retardation is controlled with heating temperature of the material film, and thereby, the hybrid retardation layer having the material film cured is formed by deposition.

Further, in the second method, at the step of forming the hybrid retardation layer by deposition, a material film of the hybrid retardation layer is deposited using light cure liquid crystal via an alignment film on the first substrate, the hybrid retardation layer having the material film cured by exposure to light is formed by deposition, a surface layer of the hybrid retardation layer is removed to a predetermined thickness, and thereby, viewing angle dependency of retardation is controlled with the hybrid retardation layer.

According to the first and second methods, the retardation of the hybrid retardation layer formed by deposition on the substrate can be easily controlled.

As described above, according to the embodiments of the invention, the alignment of the hybrid retardation layer can be improved in the liquid crystal display device of ECB mode with the hybrid retardation layer and the electronic equipment, and thus, high contrast display with good viewing angle can be performed.

BRIEF DESCRIPTION OF THE DRAWINGS

FIG. 13 shows transmittance at the time of white presentation in the liquid crystal display devices of working example 2 and comparative example 2.

FIG. 14 shows viewing angle characteristics of a transmissive liquid crystal display device having a configuration in combination of a hybrid retardation layer and a liquid crystal cell of ECB mode.

FIG. 15 shows optical photographs of hybrid retardation layers.

DESCRIPTION OF PREFERRED INVENTION

Hereinafter, embodiments applying the invention will be described in detail with reference to the drawings. In the respective embodiments, the manufacturing method will be explained according to need after the configuration of the liquid crystal display device.

First Embodiment

Figure 1:
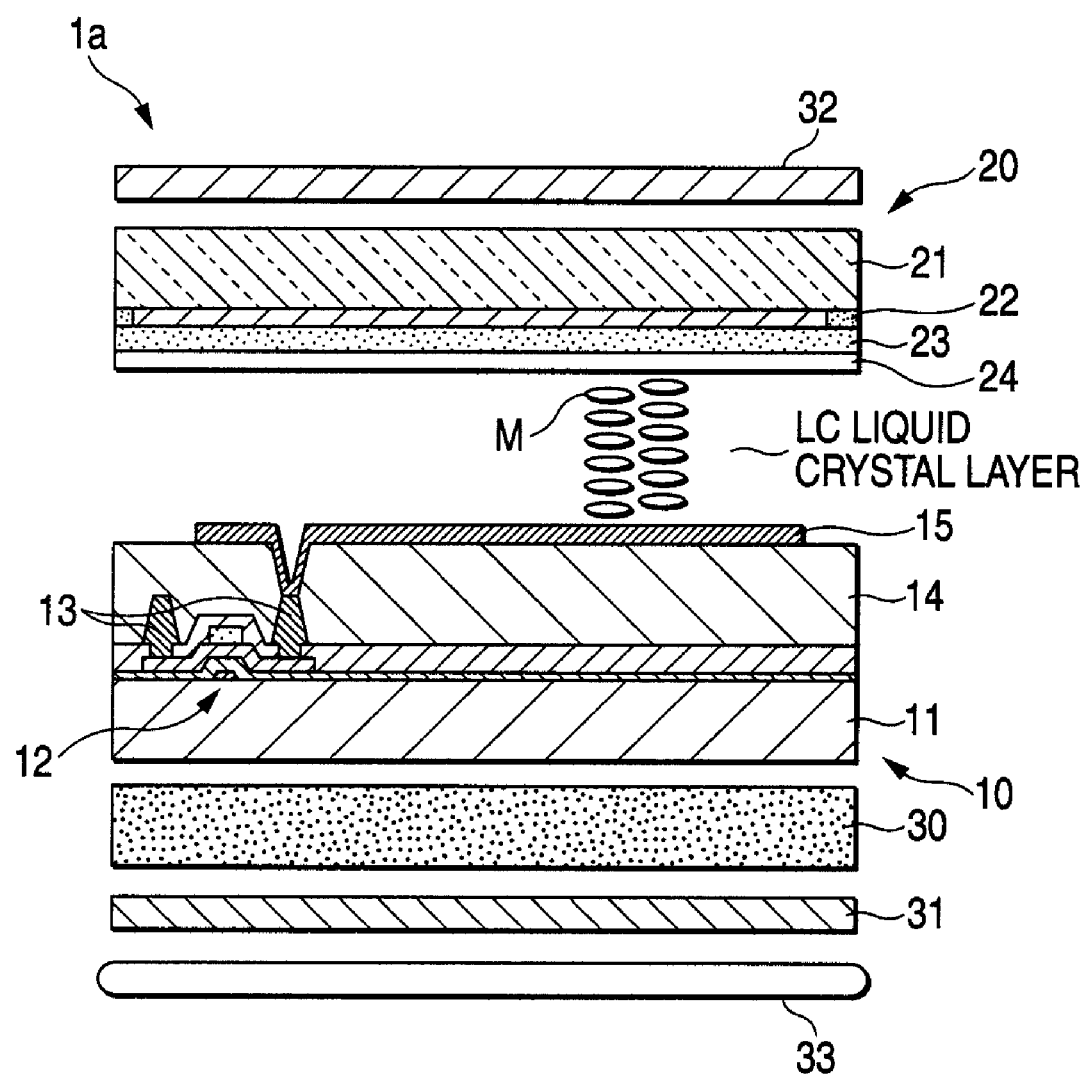
FIG. 1 is a diagram for explanation of a configuration of a liquid crystal display device of the first embodiment.

FIG. 1 is a sectional configuration diagram of a liquid crystal display device 1a of the first embodiment. The liquid crystal display device 1a shown in the drawing includes a retardation layer in which liquid crystal molecules are hybrid-aligned (hereinafter, referred to as "hybrid retardation layers), and is the transmissive liquid crystal display device 1a driven in the ECB mode and configured as below.

The liquid crystal display device 1a includes a drive substrate 10, an opposing substrate 20 oppositely located at the element formation surface side of the drive substrate 10, and a liquid crystal layer LC sandwiched between the drive substrate 10 and the opposing substrate 20. Further, a λ/4 retardation layer 30 is provided in closely contact on the outer surface of the drive substrate 10, and furthermore, polarizing plates 31, 32 are provided in close contact on the outer surfaces of the drive substrate 10 and the opposing substrate 20 in crossed nicols. A backlight 33 is provided on the outer side of the polarizing plate 31 provided at the drive substrate 10 side.

In the drive substrate 10, a drive element 12 such as a TFT (Thin Film Transistor), for example, and an electrode 13 connected thereto are provided on the surface facing the liquid crystal layer LC of a transparent substrate 11 such as a glass substrate, and these are covered by an interlayer film 14. On the interlayer film 14, pixel electrodes 15 connected to the drive element 12 via the electrode 13 are patterned with respect to each pixel.

An alignment film, the illustration of which is omitted here, is provided to cover the plural pixel electrodes 15. For example, the alignment film is rubbed or aligned at 45° relative to the transmission axis of the polarizing plate 31 at the drive substrate 10 side and at 135° (−45°) relative to the transmission axis of the polarizing plate 32 at the opposing substrate 20 side.

Further, the λ/4 retardation layer 30 is provided on the surface at the polarizing plate 31 side of the transparent substrate 11. The λ/4 retardation layer 30 is provided by bonding a film on which the λ/4 retardation layer 30 has been formed to the transparent substrate 11, for example.

On the other hand, in the opposing substrate 20, a color filter 22 of the respective colors of R (red), G (green), and B (blue), a hybrid retardation layer 23, and a counter electrode 24 are provided in this order on the surface facing the liquid crystal layer LC of a transparent substrate 21 such as a glass substrate. Furthermore, an alignment film, the illustration of which is omitted here, is provided on the counter electrode 24. The alignment film is rubbed or aligned oppositely in parallel with the alignment film provided at the drive substrate 10 side.

The hybrid retardation layer 23 may be provided directly on the transparent substrate 21, and, in this case, the color filter 22 is provided on the hybrid retardation layer 23. Further, in any configuration in which the hybrid retardation layer 23 is provided at the opposing substrate 20 side, the hybrid retardation layer 23 may be maintained in a solid film condition. That is, when the hybrid retardation layer 23 is provided at the drive substrate 10 side, patterning for providing a connecting hole that connects the electrode 13 and the pixel electrode 15 is necessary.

The above described configuration of the first embodiment is characterized in that the hybrid retardation layer 23 in which liquid crystal molecules are hybrid-aligned is a layer formed by deposition on the transparent substrate 21 surface facing the liquid crystal layer LC side.

Figure 2:
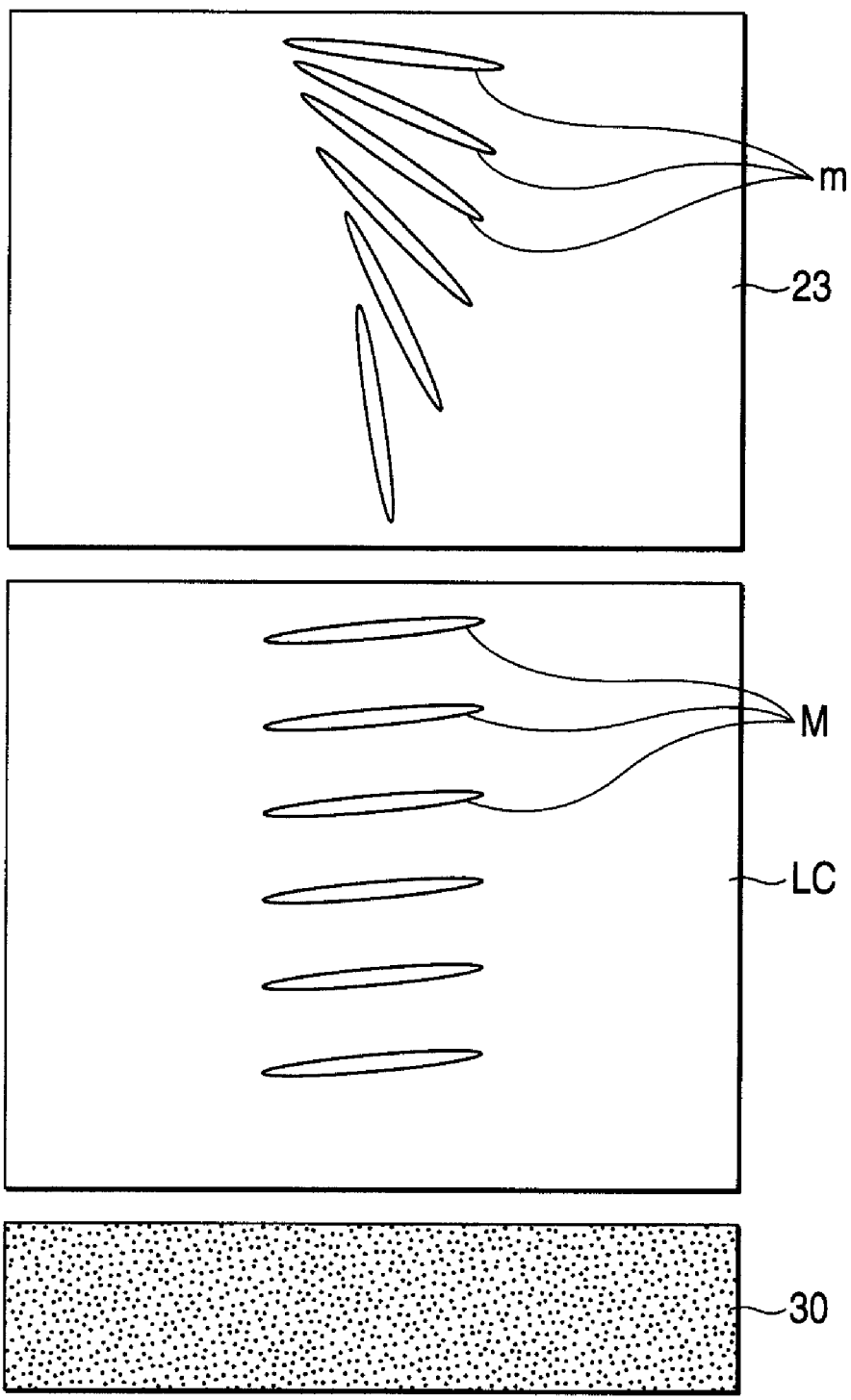
FIG. 2 is a diagram for explanation of a configuration of a hybrid retardation layer of the first embodiment.

Accordingly, as shown in FIG. 2, liquid crystal particles m in the hybrid retardation layer 23 are aligned to be horizontal with the substrate surface at the transparent substrate side of the opposing substrate and gradually and vertically raised toward the liquid crystal layer LC side. The liquid crystal molecules m have positive refractive anisotropy. In the liquid crystal display device 1a, the layers that cause retardation are provided in the order of the λ/4 layer 30, the liquid crystal layer LC, and the hybrid retardation layer 23 from the backlight side.

Further, it is generally preferable that the alignment direction of the hybrid retardation layer 23 is at an angle from 150° to 210° relative to the alignment direction of the alignment film provided above. That is, the alignment direction of the hybrid retardation layer 23 and the alignment direction of the liquid crystal layer LC at the hybrid retardation layer 23 side forms an angle from 150° to 210° and are opposite in parallel. Thereby, the viewing angle can be improved.

Furthermore, it is generally preferable that the alignment axis (i.e., alignment direction) of the hybrid retardation layer 23 is at an angle from 80° to 100° relative to the optical axis of the λ/4 retardation layer 30.

Here, the liquid crystal layer LC sandwiched between the drive substrate 10 and the opposing substrate 20 includes liquid crystal molecules M having positive dielectric anisotropy.

The hybrid retardation layer 23 and the liquid crystal layer LC are configured so that the total retardation may be retardation of $3\lambda/4$ opposite to that of the $\lambda/4$ retardation layer 30 when no voltage is applied to the pixel electrodes 15 and the counter electrode 24, and retardation of $\lambda/4$ opposite to that of the $\lambda/4$ retardation layer 30 when a voltage is applied.

The liquid crystal display device 1a having the above described configuration provides normally white display in white presentation when no voltage is applied.

That is, when no voltage is applied, the hybrid retardation layer 23 and the liquid crystal layer LC produce the retardation of $3\lambda/4$ opposite to that of the $\lambda/4$ retardation layer 30, and therefore, the total retardation from the $\lambda/4$ retardation layer 30 through the liquid crystal layer LC to the hybrid retardation layer 23 is $\lambda/2$. Accordingly, the light of the backlight 33 linearly polarized at the polarizing plate 31 and further linearly polarized to 90° through the $\lambda/4$ retardation layer 30, the liquid crystal layer LC, and the hybrid retardation layer 23 and is transmitted through the polarizing plate 32, and provides white presentation. Further, when a voltage is applied, the hybrid retardation layer 23 and the liquid crystal layer LC produce the retardation of $\lambda/4$ opposite to that of the $\lambda/4$ retardation layer 30, and therefore, the retardation is totally cancelled from the $\lambda/4$ retardation layer 30 through the liquid crystal layer LC to the hybrid retardation layer 23. Accordingly, the light of the backlight 33 linearly polarized at the polarizing plate 31 enters the polarizing plate 32 without change and is absorbed there, and provides black presentation.

The retardation is not limited to the above described retardation as long as the hybrid retardation layer 23 and the liquid crystal layer LC are set so that the total retardation from the $\lambda/4$ retardation layer 30 through the liquid crystal layer LC to the hybrid retardation layer 23 may be $\lambda/2$ when no voltage is applied and the total retardation from the $\lambda/4$ retardation layer 30 through the liquid crystal layer LC to the hybrid retardation layer 23 may be zero when a voltage is applied.

Further, the liquid crystal display device 1a having the above described configuration is used as a display in electronic equipment such as a cellular phone, PDA, or computer.

Next, a method of manufacturing the liquid crystal display device 1a having the above described configuration will be described sequentially from a method of making the opposing substrate 20 side having the layer configuration containing the hybrid retardation layer 23, which is especially characteristic in the first embodiment, with reference to FIG. 1 according to a flowchart of FIG. 3.

First, at step S1, the color filter 22 is formed on the transparent substrate 21. The formation of the color filter 22 is performed in the same manner as that in the past, and not specifically limited.

The formation process of the hybrid retardation layer 23 starts from the next step S2. First, at step S2, the alignment film is deposited to cover the color filter 22. At the next step S3, rubbing treatment or photo-alignment treatment is performed on the alignment film to provide alignment to the alignment film. Here, the treatment is performed to provide the alignment direction of the hybrid retardation layer 23 to be subsequently formed.

Then, at step S4, a hybrid material film is deposited by coating on the transparent substrate 21 where the alignment film has been formed. The hybrid material used here is UV-curable nematic crystal liquid, and has a molecule structure in which acrylate group is bonded to nematic liquid crystal, for example.

At the subsequent step S5, the hybrid material film deposited by coating is heat-treated for removing the solvent in the hybrid material. Then, at step S6, the entire surface of the hybrid material film is exposed to light for curing in the sate in which the liquid crystal molecules in the hybrid material film in the hybrid-aligned. In this regard, variations in retardation due to the viewing angle is controlled by exposure of the hybrid material film to light while heating of the film to a predetermined temperature. Thereby, the hybrid retardation layer 23 providing a desired retardation is obtained.

Figure 4:
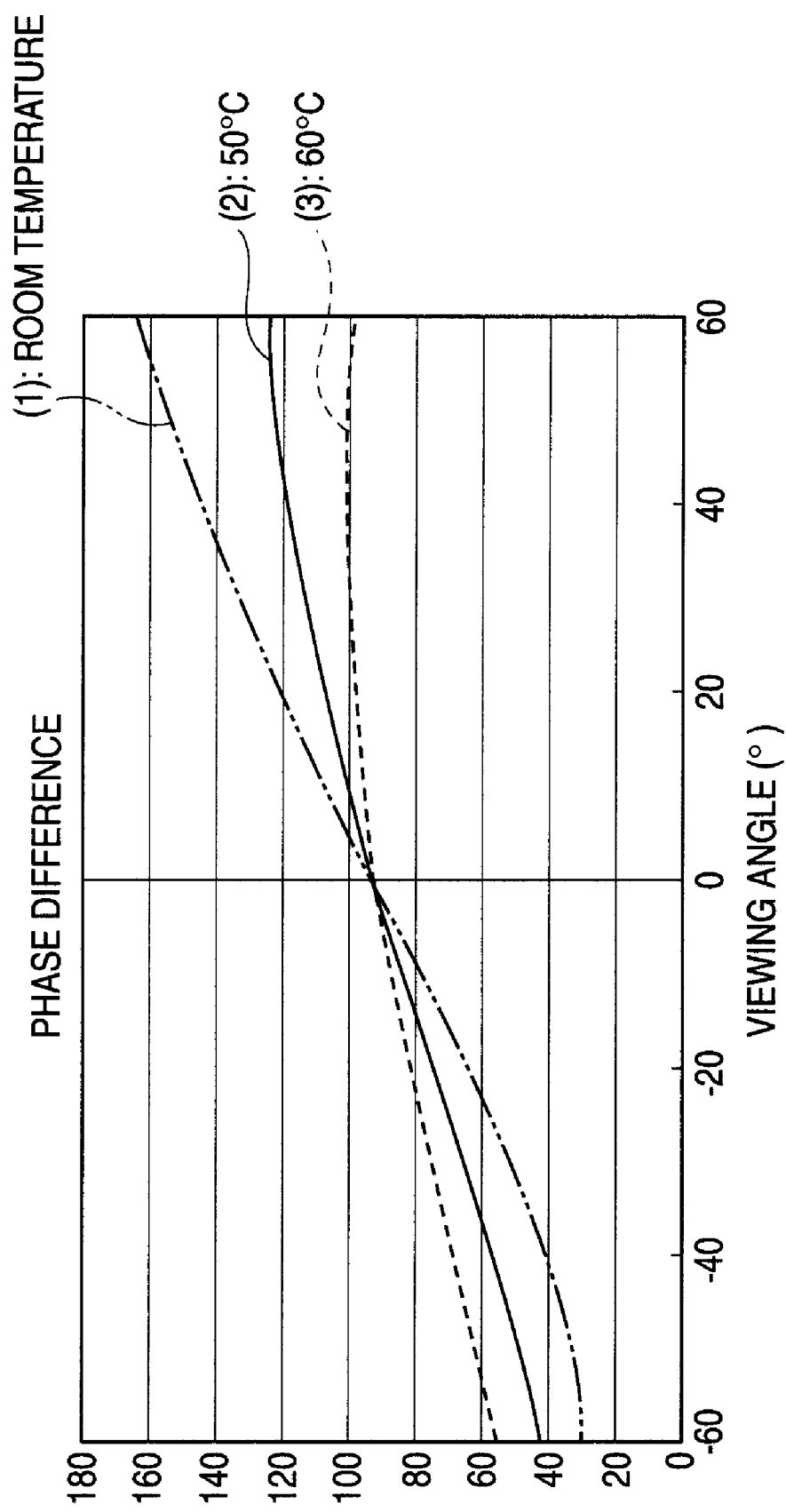
FIG. 4 shows viewing angle dependency of retardation in the hybrid retardation layer.

FIG. 4 shows viewing angle dependency of retardation in the hybrid retardation layer 23 obtained as described above with respect to each heating temperature for the hybrid material film at the time of exposure. As shown in the drawing, it is seen that the higher the heating temperature at the time of exposure, the smaller the amount of change in retardation dependent on the viewing angle. Therefore, exposure at an adjusted temperature is performed to make the retardation of the hybrid retardation layer 23 desirably dependent on the viewing angle.

The above described viewing angle dependency of retardation in the hybrid retardation layer 23 may be controlled by removing the upper layer after forming the hybrid retardation layer 23 by deposition. In this case, the hybrid retardation layer 23 shown in FIG. 2 is removed by ashing from the upper side at which the liquid crystal molecules m are vertically aligned. Then, the viewing angle dependency of retardation in the hybrid retardation layer 23 may be controlled by adjusting the thickness of the film to be removed in a range from about 5 to 50% relative to the film thickness at the time of formation by deposition, for example.

After the hybrid retardation layer 23 having the desired viewing angle characteristic is formed in the above described manner, at step S7, the counter electrode 24 of a transparent conducting material such as ITO is formed on the hybrid retardation layer 23. Then, the alignment film for liquid crystal layer LC is deposited on the counter electrode 24 and rubbing treatment or UV-alignment treatment is performed in a predetermined alignment direction, and thereby, the opposing substrate 20 is completed.

On the other hand, though omitted the illustration in the flowchart, the drive substrate 10 side may be formed in the same procedure as that in the past. That is, the drive element 12 and the electrode 13 connected thereto are formed on the transparent substrate 11, these are covered by the interlayer film 14, the pixel electrodes 15 connected to the drive element 12 via the electrode 13 are patterned on the interlayer film 14, and further, the alignment film is formed to cover them.

After the formation, an assembly process of bonding the drive substrate 10 to the opposing substrate 20 is performed. Here, the pixel electrodes 15 and the counter electrode 24 are oppositely positioned to face each other and a peripheral portion positioned therefore. Then, these substrates 10 and 20 are bonded with a sealant (omitted to be shown) provided on the peripheral portion between the substrates 10 and 20 while a predetermined cell gap is held between the substrates 10 and 20 by interposing a spacer, the illustration of which is omitted here, between the drive substrate 10 and the opposing substrate 20. In this regard, the alignment directions of the alignment film at the drive substrate 10 side and the alignment film at the opposing substrate 20 side are set oppositely in parallel. Then, the liquid crystal layer LC is injected between the substrates 10 and 20 from a gap of the sealing resin and sealed.

Subsequently, the film like λ/4 retardation layer 30 is bonded to the outer surface of the drive substrate 10 and the polarizing plates 31, 32 are bonded to the outer surfaces of the substrates 10 and 20 in crossed nicols to each other and at 450 relative to the optical axis of the λ/4 retardation layer 30 and the optical axis of the liquid crystal layer LC, and thereby, the liquid crystal display device 1a is completed.

In thus obtained liquid crystal display device 1a, the hybrid retardation layer 23 is formed by deposition via the color filter 22 on the transparent substrate 21, and therefore, the alignment of the hybrid retardation layer 23 can be improved. That is, in the case where the hybrid retardation layer 23 is formed by coating on the film base material for the purpose of being bonded to the transparent substrate 21, good alignment characteristic can hardly be obtained for the hybrid retardation layer. However, in the liquid crystal display device 1a, the hybrid retardation layer 23 is formed by deposition on the hard transparent substrate 21 such as a glass substrate, and therefore, the alignment of the hybrid retardation layer 23 can be improved. Thereby, the retardation characteristic of the hybrid retardation layer 23 can be made homogeneous.

Consequently, in the liquid crystal display device 1a provided with the hybrid retardation layer 23 and electronic equipment using the liquid crystal display device 1a, the alignment of the hybrid retardation layer can be improved, and thereby, high contrast display with a good viewing angle can be realized.

In the case of the configuration in which the hybrid retardation layer 23 is provided directly on the transparent substrate 21 and the color filter 22 is provided on the hybrid retardation layer 23, the alignment of the hybrid retardation layer 23 can be further improved because the foundation on which the hybrid retardation layer 23 is formed by deposition is flatter.

Further, since the hybrid retardation layer 23 is provided at the liquid crystal layer LC side on the transparent substrate 21, in the manufacture of the liquid crystal display device 1a, the hybrid retardation layer 23 is hardly damaged in and after the assembly process in which the drive substrate 10 and the opposing substrate 20 are bonded, and therefore, the deterioration of the display characteristic due to damage in and after the assembly process can be prevented.

Figure 3:
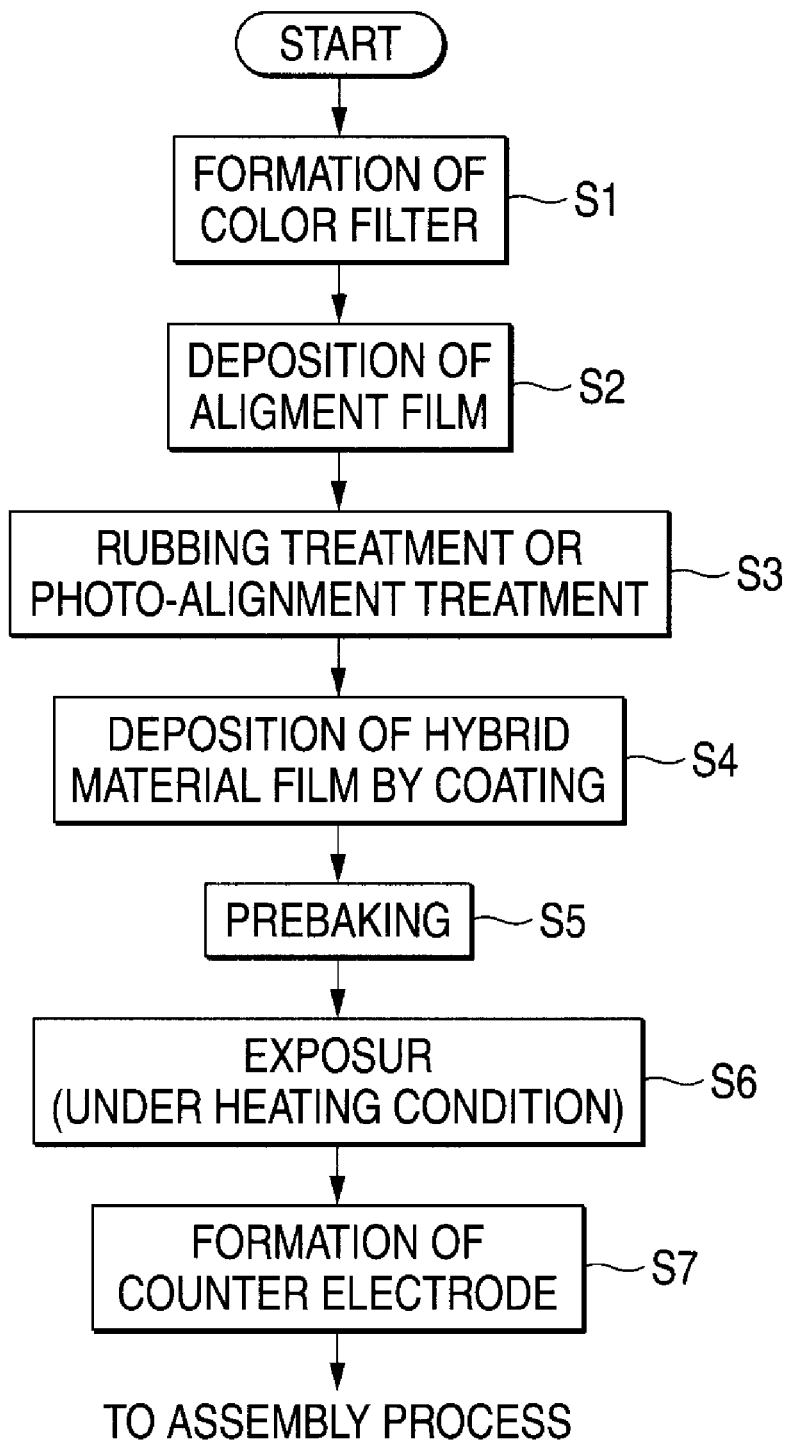
FIG. 3 is a flowchart for explanation of a manufacture of the liquid crystal display device of the first embodiment.

Furthermore, in the manufacturing method described using the flowchart of FIG. 3, the viewing angle dependency of retardation in the hybrid retardation layer 23 can be easily controlled by the heating temperature at the time of exposure in the formation by deposition of the hybrid retardation layer 23 or decrease in film thickness after the hybrid retardation layer 23 is formed. Thereby, it is not necessary to adjust the retardation of the λ/4 retardation layer 30 used in combination of the hybrid retardation layer 23. Therefore, the transmittance and chromaticity can be kept in a good condition.

Second Embodiment

Figure 5:
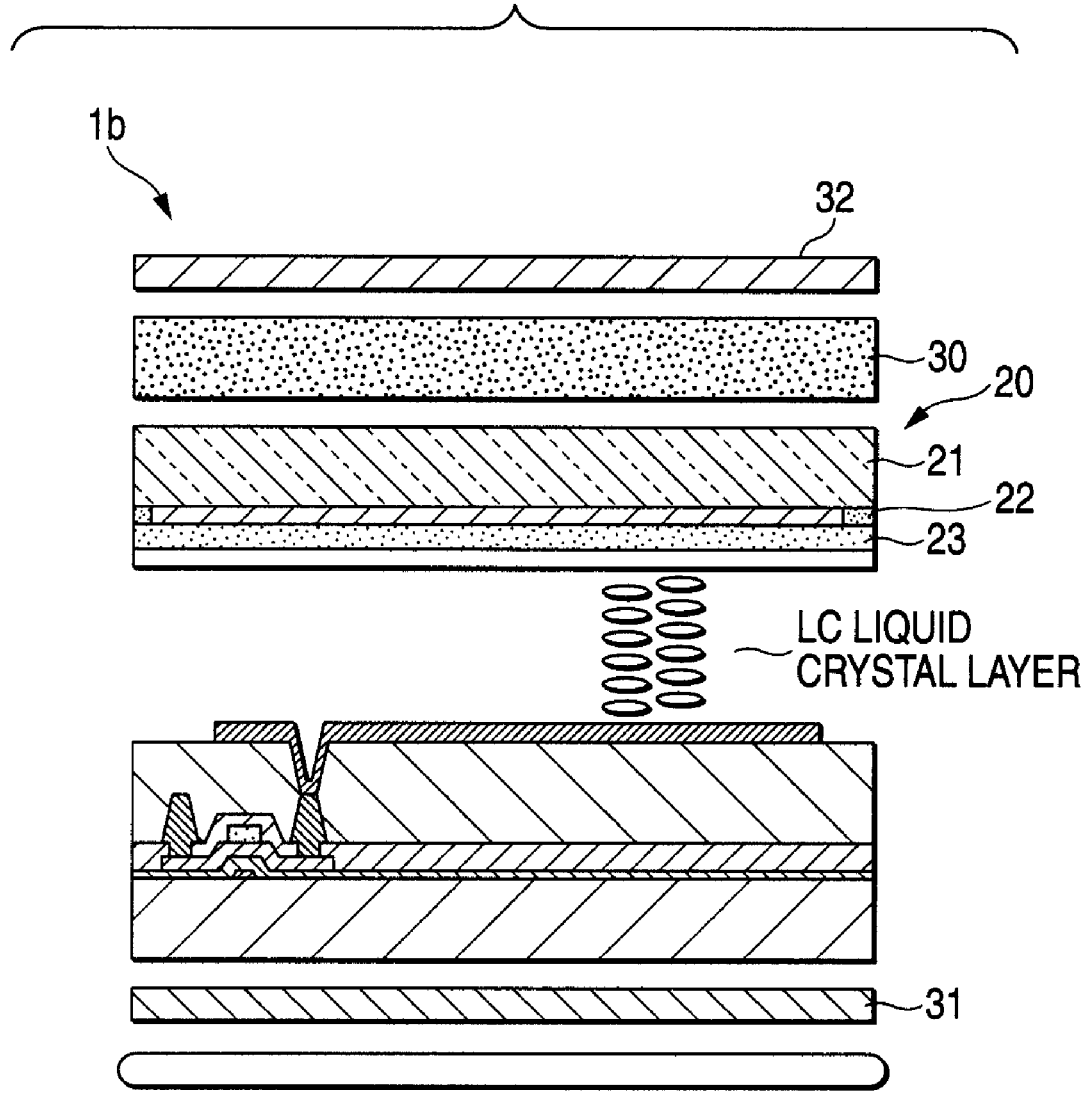
FIG. 5 is a diagram for explanation of a configuration of a liquid crystal display device of the second embodiment.

FIG. 5 is a sectional configuration diagram of a liquid crystal display device 1b of the second embodiment. The liquid crystal display device 1b shown in the drawing is different from the liquid crystal display device of the first embodiment that has been described using FIG. 1 in that the λ/4 retardation layer 30 is provided at the opposing substrate 20 side. Other configuration is the same as that of the first embodiment.

Figure 6:
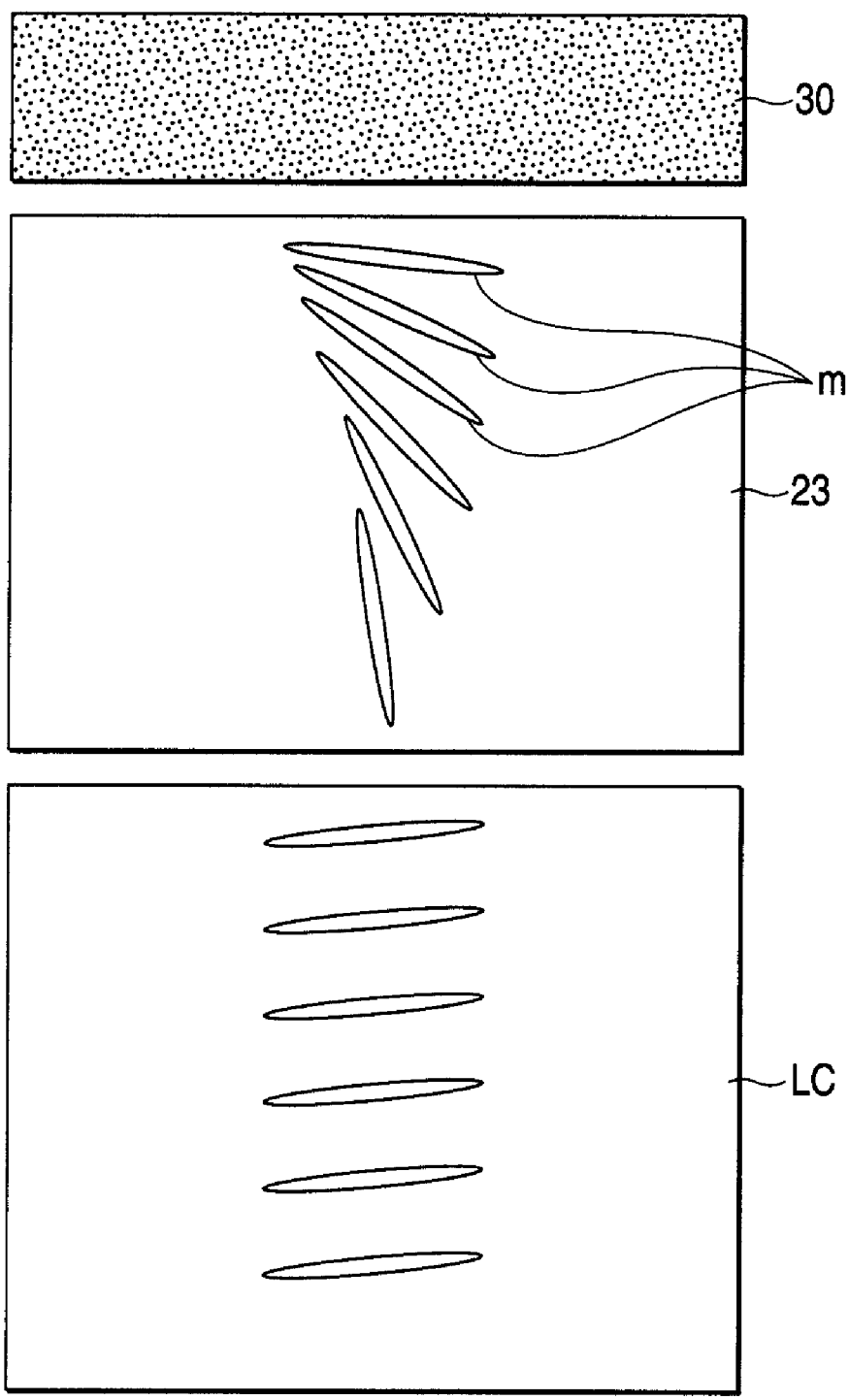
FIG. 6 is a diagram for explanation of a configuration of a hybrid retardation layer of the second embodiment.

That is, the second embodiment is also characterized in that the hybrid retardation layer 23 is a layer formed by deposition on the transparent substrate 21 surface facing the liquid crystal layer LC side of the opposing substrate 20 side. Accordingly, as shown in FIG. 6, the liquid crystal particles m in the hybrid retardation layer 23 are aligned to be horizontal at the transparent substrate side of the opposing substrate and gradually and vertically raised toward the liquid crystal layer LC side. In the liquid crystal display device 1b, the layers that cause retardation are provided in the order of the liquid crystal layer LC, the hybrid retardation layer 23, and the λ/4 retardation layer 30 from the backlight side.

The liquid crystal display device 1b having the above described configuration also provides normally white display in white presentation when no voltage is applied like the liquid crystal display device of the first embodiment.

Further, the use of the liquid crystal display device 1b having the above described configuration as a display in electronic equipment such as a cellular phone, PDA, or computer is the same as that of the first embodiment.

Furthermore, the liquid crystal display device 1b having the above described configuration is fabricated by performing the manufacturing procedure that has been described in the first embodiment to the steps of filling the space between the drive substrate 10 and the opposing substrate 20 with the liquid crystal layer LC and sealing it in the same manner, and then, bonding the film-like λ/4 retardation layer 30 to the outer surface of the opposing substrate 20, and further, bonding the polarizing plates 31, 32 to the outer surfaces of the drive substrate 10 and the opposing substrate 20 in crossed nicols.

The liquid crystal display device 1b obtained as described above is also capable of high contrast display with a good viewing angle in the liquid crystal display device 1b of ECB mode with the hybrid retardation layer 23 and electronic equipment using the liquid crystal display device 1b as is the case of the first embodiment because the hybrid retardation layer 23 is formed by deposition via the color filter 22 on the transparent substrate 21.

Further, with the configuration in which the hybrid retardation layer 23 is provided at the liquid crystal layer LC side on the transparent substrate 21, the effect that the deterioration in display characteristic due to damage in or after the assembly process can be prevented is similarly obtained.

Third Embodiment

Figure 7:
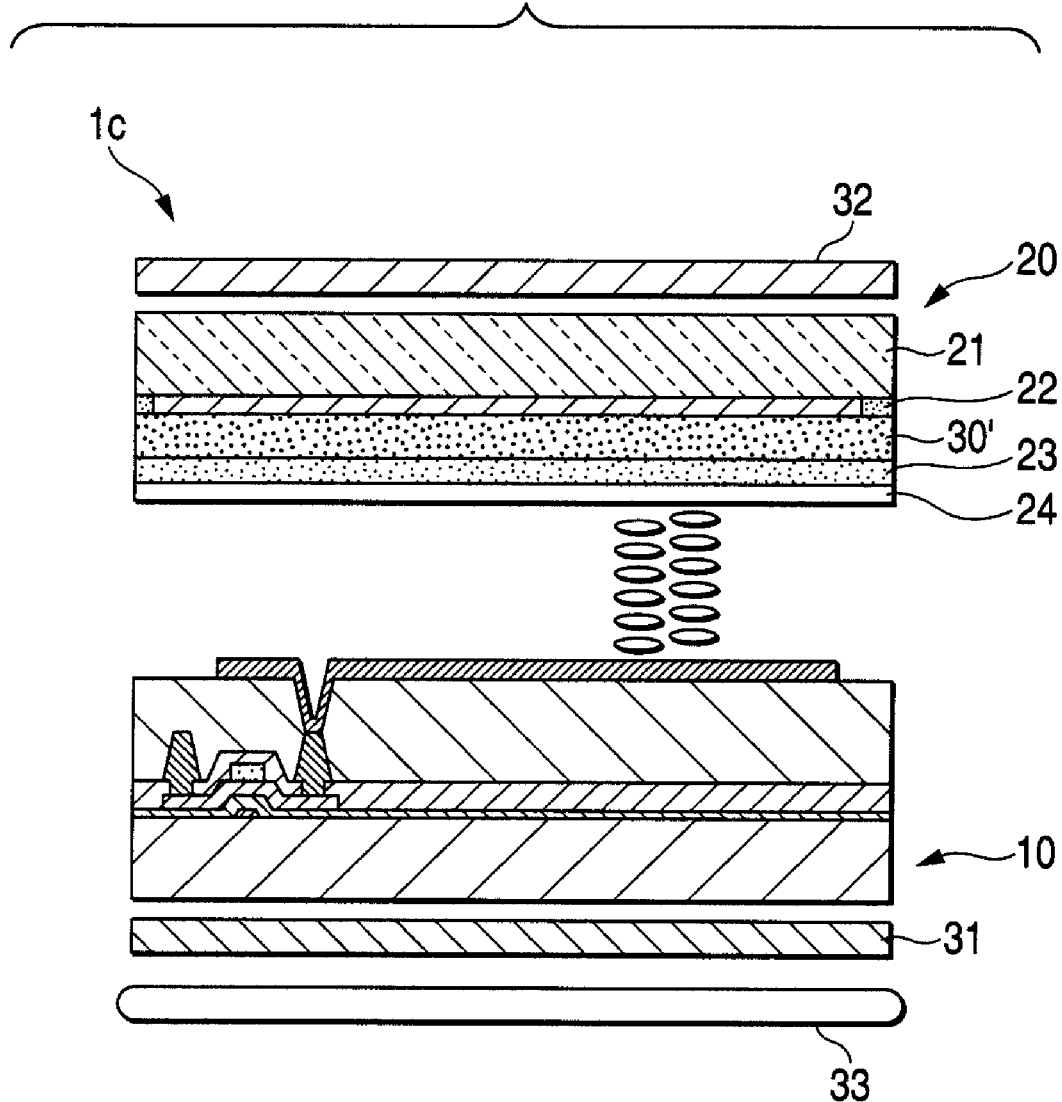
FIG. 7 is a diagram for explanation of a configuration of a liquid crystal display device of the third embodiment.

FIG. 7 is a sectional configuration diagram of a liquid crystal display device 1c of the third embodiment. The liquid crystal display device 1c shown in the drawing is different from the liquid crystal display device of the first embodiment that has been described using FIG. 1 in that a λ/4 retardation layer 30' is provided with the hybrid retardation layer 23 at the liquid crystal layer LC side in the opposing substrate 20. Other configuration is the same as that of the first embodiment.

That is, the third embodiment is characterized in that the hybrid retardation layer 23 and the λ/4 retardation layer 30' are layers formed by deposition on the transparent substrate 21 surface facing the liquid crystal layer LC side. Further, with reference to FIG. 6, the liquid crystal particles m in the hybrid retardation layer 23 are aligned to be horizontal at the transparent substrate side of the opposing substrate and gradually and vertically raised toward the liquid crystal layer LC side.

On the other hand, the λ/4 retardation layer 30' may be normal homogeneously aligned UV curable liquid crystal. Further, the alignment direction of the λ/4 retardation layer 30' is at 90° relative to the alignment direction of the hybrid retardation layer 23.

The layers that cause retardation are provided in the order of the liquid crystal layer LC, the hybrid retardation layer 23, and the λ/4 layer 30' from the backlight side.

The liquid crystal display device 1c having the above described configuration also provides normally white display in white presentation when no voltage is applied like the liquid crystal display device of the first embodiment.

Further, the use of the liquid crystal display device 1c having the above described configuration as a display in electronic equipment such as a cellular phone, PDA, or computer is the same as that of the first embodiment.

Next, a method of manufacturing the liquid crystal display device 1c having the above described configuration will be described with reference to FIG. 7 according to a flowchart of FIG. 8 sequentially from a method of making the opposing substrate 20 side having a layer configuration containing the hybrid retardation layer 23 and the λ/4 retardation layer 30', which characterizes the third embodiment.

First, at step S1, the color filter 22 is formed on the transparent substrate 21 in the same manner as in the first embodiment. Then, steps S2' to S6' are the formation process of the λ/4 retardation layer 30'. First, the alignment film is deposited at step S2', and rubbing treatment or photo-alignment treatment is performed on the alignment film to provide alignment to the alignment film at the next step S3'. The direction of the rubbing treatment or photo-alignment treatment here is the same as the alignment direction of the λ/4 retardation layer 30' formed here. Then, at step S4', a retardation material film of UV curable liquid crystal is deposited on the opposing substrate 21 in a predetermined thickness where the alignment film has been formed. At the subsequent step S5', the retardation material film deposited by coating is heat-treated for removing the solvent. Then, at step S6', the entire surface of the retardation material film is exposed to light to cure, and the λ/4 retardation layer 30' is obtained.

Then, steps S2 to S6 are performed in the same manner as in the first embodiment, and the hybrid retardation layer 23 is formed on the λ/4 retardation layer 30' that has been formed by coating.

Subsequently, at step S7, in the same manner as in the first embodiment, the counter electrode 24 made of a transparent conducting material such as ITO is formed on the hybrid retardation layer 23, and then, the alignment film for liquid crystal layer LC is deposited, rubbing treatment or photo-alignment treatment is performed in a predetermined alignment direction, and the opposing substrate 20 is completed.

In the subsequent assembly process, using the drive substrate 10 formed in the same procedure as in the past, the space between the drive substrate 10 and the opposing substrate 20 is filled with the liquid crystal layer LC and sealed in the same manner as in the first embodiment, and then, the polarizing plates 31, 32 are bonded to the outer surfaces of the drive substrate 10 and the opposing substrate 20 in crossed nicols. Thereby, the liquid crystal display device 1c is completed.

The liquid crystal display device 1c obtained as described above is also capable of high contrast display with a good viewing angle in the liquid crystal display device 1c of ECB mode with the hybrid retardation layer 23 and electronic equipment using the liquid crystal display device 1c as is the case of the first embodiment because the hybrid retardation layer 23 is formed by deposition via the color filter 22 on the transparent substrate 21.

Further, with the configuration in which the hybrid retardation layer 23 and the λ/4 retardation layer 30' are provided at the liquid crystal layer LC side on the transparent substrate 21, the hybrid retardation layer 23 and the λ/4 retardation layer 30' are hardly damaged in or after the assembly process of bonding the drive substrate 10 and the opposing substrate 20, and the deterioration in display characteristic due to damage in or after the assembly process can be prevented.

Furthermore, since the λ/4 retardation layer 30' is also provided at the liquid crystal layer LC side on the transparent substrate 21, i.e., within the liquid crystal cell, the liquid crystal display device 1c can be made thinner compared to the configuration in which the film-like λ/4 retardation layer is bonded to the outer side of the liquid crystal cell.

Fourth Embodiment

Figure 9:
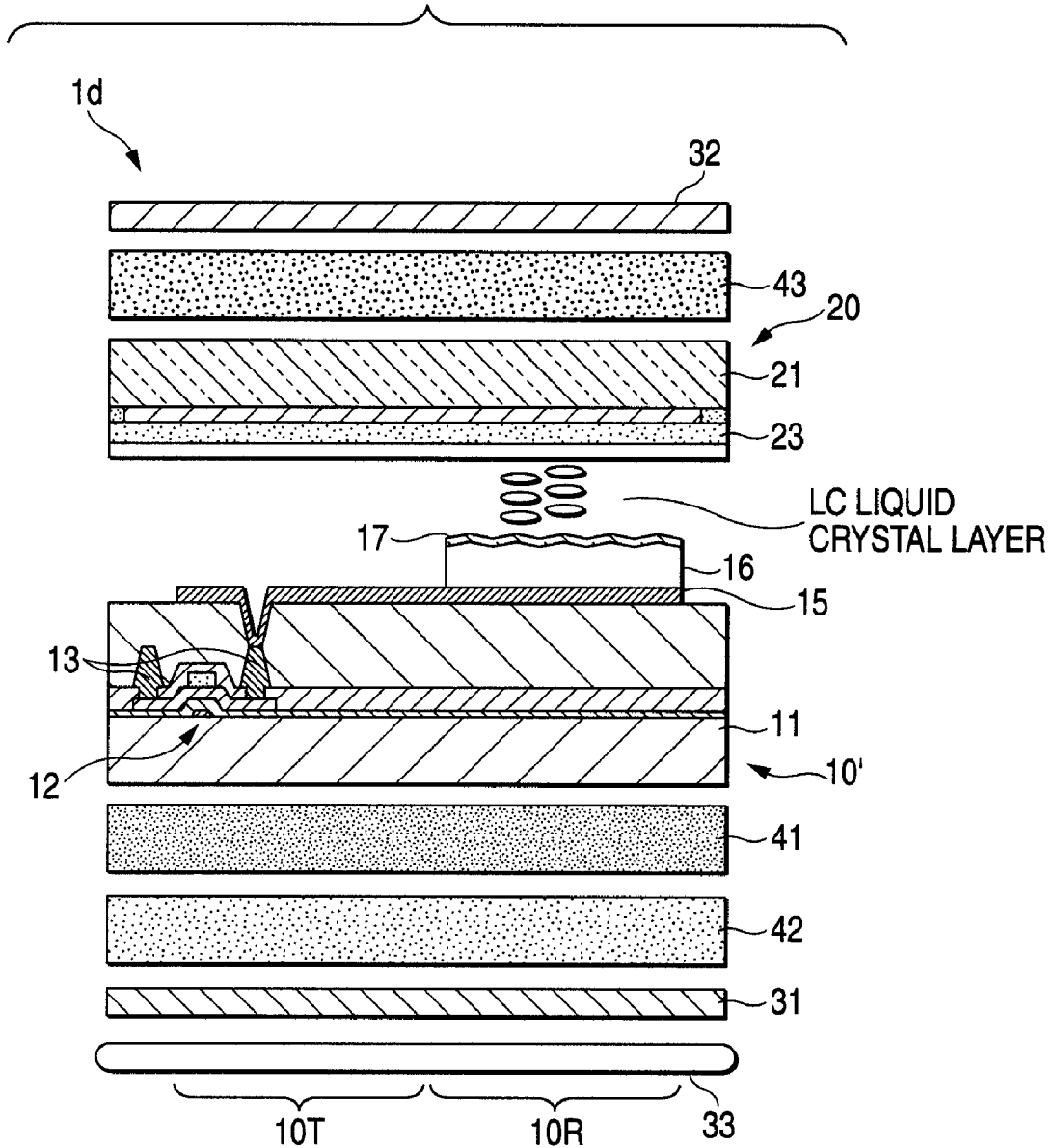
FIG. 9 is a diagram for explanation of a configuration of a liquid crystal display device of the fourth embodiment.

FIG. 9 is a sectional configuration diagram of a liquid crystal display device 1d of the fourth embodiment. Here, an embodiment in which the invention is applied to a semi-transmissive liquid crystal display device will be described. The liquid crystal display device 1d shown in the drawing is a semi-transmissive liquid crystal display device 1d provided with the retardation layer in which liquid crystal molecules are hybrid-aligned (hereinafter, referred to as hybrid retardation layer) and driven in the ECB mode and configured as follows.

That is, the liquid crystal display device 1d includes a drive substrate 10' having a reflective display part 10R and a transmissive display part 10T with respect to each pixel, the opposing substrate 20 oppositely located at the element formation surface side of the drive substrate 10', and a liquid crystal layer LC sandwiched between the drive substrate 10' and the opposing substrate 20. A wideband λ/4 layer including a λ/4 retardation layer 41 and a λ/2 retardation layer 42 are provided on the outer surface of the drive substrate 10'. A λ/2 retardation layer 43 is provided on the outer side of the opposing substrate 20, and further, the polarizing plates 31, 32 are provided in close contact on the outer surfaces of the drive substrate 10' and the opposing substrate 20 in crossed nicols. Further, the backlight 33 is provided on the outer side of the polarizing plate 31 provided at the drive substrate 10' side.

In the drive substrate 10', the drive element 12 such as a TFT (Thin Film Transistor), for example, and the electrode 13 connected thereto are provided on the surface facing the liquid crystal layer LC of the transparent substrate 11 such as a glass substrate, and these are covered by an interlayer film 14. On the interlayer film 14, the pixel electrodes 15 made of a transparent conducting material connected to the drive element 12 via the electrode 13 are patterned with respect to each pixel. In the reflective display part 10R in each pixel, a reflection electrode 17 connected to the pixel electrode 15 is patterned.

An alignment film, the illustration of which is omitted here, is provided to cover the plural pixel electrodes 15 and reflection electrodes 17. The alignment film is rubbed or aligned at 60° relative to the transmission axis of the polarizing plate 32 at the opposing substrate 20 side and at 45° relative to the λ/2 retardation layer 43.

Further, the λ/4 retardation layer 41 and the λ/2 retardation layer 42 are provided in this order on the surface at the polarizing plate 31 side of the transparent substrate 11. These λ/4 retardation layer 41 and λ/2 retardation layer 42 are provided by sequentially bonding films on which the respective retardation layers have been formed to the transparent substrate 11, for example.

On the other hand, in the opposing substrate 20 with the same configuration as that of the first embodiment, the color filter 22, the hybrid retardation layer 23, the counter electrode 24, and further the alignment film (the illustration of which is omitted) are provided in this order on the surface facing the liquid crystal layer LC of the transparent substrate 21 such as a glass substrate. The alignment film is rubbed or aligned oppositely in parallel with the alignment film provided at the drive substrate 10 side.

The hybrid retardation layer 23 may be provided directly on the transparent substrate 21 as is the case of the first embodiment.

The fourth embodiment is also characterized in that the hybrid retardation layer 23 is a layer formed by deposition on the transparent substrate 21 surface facing the liquid crystal layer LC side of the opposing substrate 20 side. Accordingly, liquid crystal particles in the hybrid retardation layer 23 are aligned to be horizontal with the substrate surface at the transparent substrate 21 side of the opposing substrate 20 and gradually and vertically raised toward the liquid crystal layer LC side. The liquid crystal molecules m have positive refractive anisotropy.

Further, the λ/2 retardation layer 43 is provided on the surface at the polarizing plate 32 in the transparent substrate 21. The λ/2 retardation layer 43 is provided by bonding a film on which a retardation layer has been formed to the transparent substrate 21, for example.

As described above, in the liquid crystal display device 1d, the layers that cause retardation are provided in the order of the λ/2 retardation layer 42, the λ/4 retardation layer 41, the liquid crystal layer LC, the hybrid retardation layer 23, and the λ/2 retardation layer 43 from the backlight side.

Further, the alignment direction of the hybrid retardation layer 23 is set so that optical axes of the λ/2 retardation layer 43 and the hybrid retardation layer 23 form 45° from each other when the λ/2 retardation layer 43 is at 15° relative to the axis of the polarizing plate 32 for providing wideband λ/4 to the λ/2 retardation layer 43.

Here, the liquid crystal layer LC sandwiched between the drive substrate 10' and the opposing substrate 20 includes liquid crystal molecules having positive dielectric anisotropy.

The hybrid retardation layer 23 and the liquid crystal layer LC have the cell gap of the transmissive display part 10T and the reflective display part 10R adjusted by a gap adjustment layer 16 provided in the under layer of the reflection electrode 17, for example, so that the liquid crystal display device 1d having the above described configuration provides normally white display in white presentation when no voltage is applied.

That is, when no voltage is applied, at the reflective display part 10R, the light from the backlight 33 that has entered from the polarizing plate 32 side and linearly polarized travels back and forth among the λ/2 retardation layer 43, the hybrid retardation layer 23, and the liquid crystal layer LC, and therefore, returns into original linearly polarized light, passes through the polarizing plate 32, and provides white presentation. Further, at the transmissive display part 10T, the light of the backlight 33 that has been linearly polarized at the polarizing plate 31 is further linearly polarized to 90° and transmitted through the polarizing plate 32, and provides white presentation.

Further, when a voltage is applied, at the reflective display part 10R, the light from the backlight 33 that has entered from the polarizing plate 32 side and linearly polarized travels back and forth among the λ/2 retardation layer 43, the hybrid retardation layer 23, and the liquid crystal layer LC, and therefore, linearly polarized to 90°, absorbed by the polarizing plate 32, and provides black presentation. Furthermore, at the transmissive display part 10T, the light of the backlight 33 that has been linearly polarized at the polarizing plate 31 returns into the original linearly polarized light, absorbed by the polarizing plate 32, and provides black presentation.

In addition, the use of the liquid crystal display device 1d having the above described configuration as a display in electronic equipment such as a cellular phone, PDA, or computer is the same as that of the first embodiment.

The manufacture of the liquid crystal display device 1d having the above described configuration may be performed in the same procedure as in the past except that the formation of the hybrid retardation layer 23 is performed as at steps S2 to S6 that have been described using FIG. 3 in the first embodiment.

The liquid crystal display device 1d obtained as described above is also capable of high contrast display with a good viewing angle in the liquid crystal display device 1d of ECB mode with the hybrid retardation layer 23 and electronic equipment using the liquid crystal display device 1d as is the case of the first embodiment because the hybrid retardation layer 23 is formed by deposition via the color filter 22 on the transparent substrate 21.

Fifth Embodiment

Figure 10:
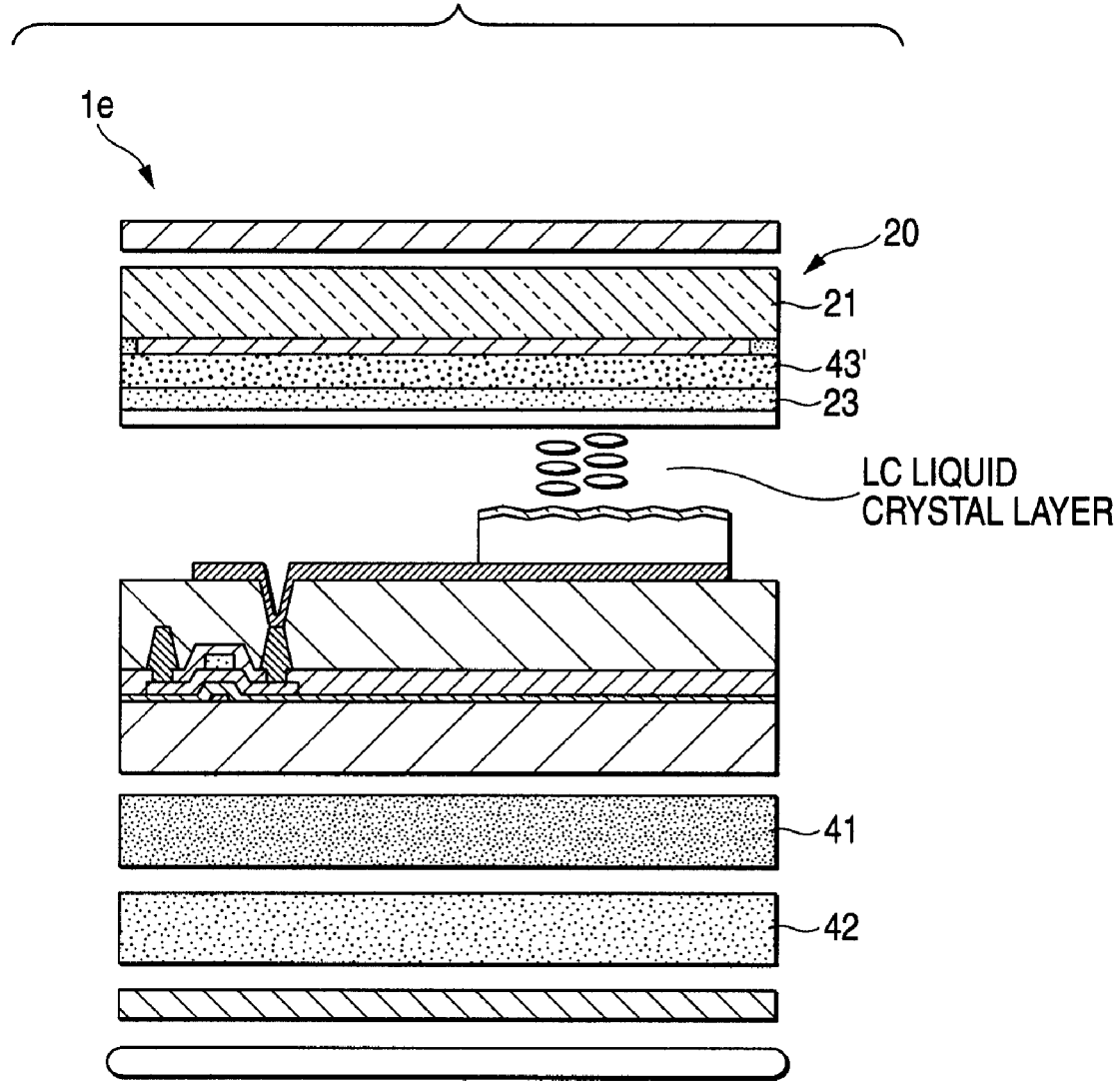
FIG. 10 is a diagram for explanation of a configuration of a liquid crystal display device of the fifth embodiment.

FIG. 10 is a sectional configuration diagram of a liquid crystal display device 1e of the fifth embodiment. The liquid crystal display device 1e shown in the drawing is different from the liquid crystal display device of the fourth embodiment that has been described using FIG. 9 in that a λ/2 retardation layer 43' is provided with the hybrid retardation layer 23 at the liquid crystal layer LC side in the opposing substrate 20. Other configuration is the same as that of the fourth embodiment.

That is, the fifth embodiment is characterized in that the hybrid retardation layer 23 and the λ/2 retardation layer 43' are layers deposited on the transparent substrate 21 surface facing the liquid crystal layer LC side of the opposite substrate 20 side. Further, the liquid crystal particles in the hybrid retardation layer 23 are aligned to be horizontal at the transparent substrate side of the opposing substrate and gradually and vertically raised toward the liquid crystal layer LC side. The layers that cause retardation are provided in the order of the λ/2 retardation layer 42, the λ/4 retardation layer 41, the liquid crystal layer LC, the hybrid retardation layer 23, and the λ/2 layer 43' from the backlight 33 side.

The cell gap of the transmissive display part 10T and the reflective display part 10R in the liquid crystal layer LC are adjusted by the reflection electrode 17, for example, so that the liquid crystal display device 1e having the above described configuration provides normally white display in white presentation when no voltage is applied as is the case of the liquid crystal display device of the fourth embodiment.

Further, the user of the liquid crystal display device 1e having the above described configuration as a display in electronic equipment such as a cellular phone, PDA, or computer is the same as that of the other embodiments.

Figure 8:
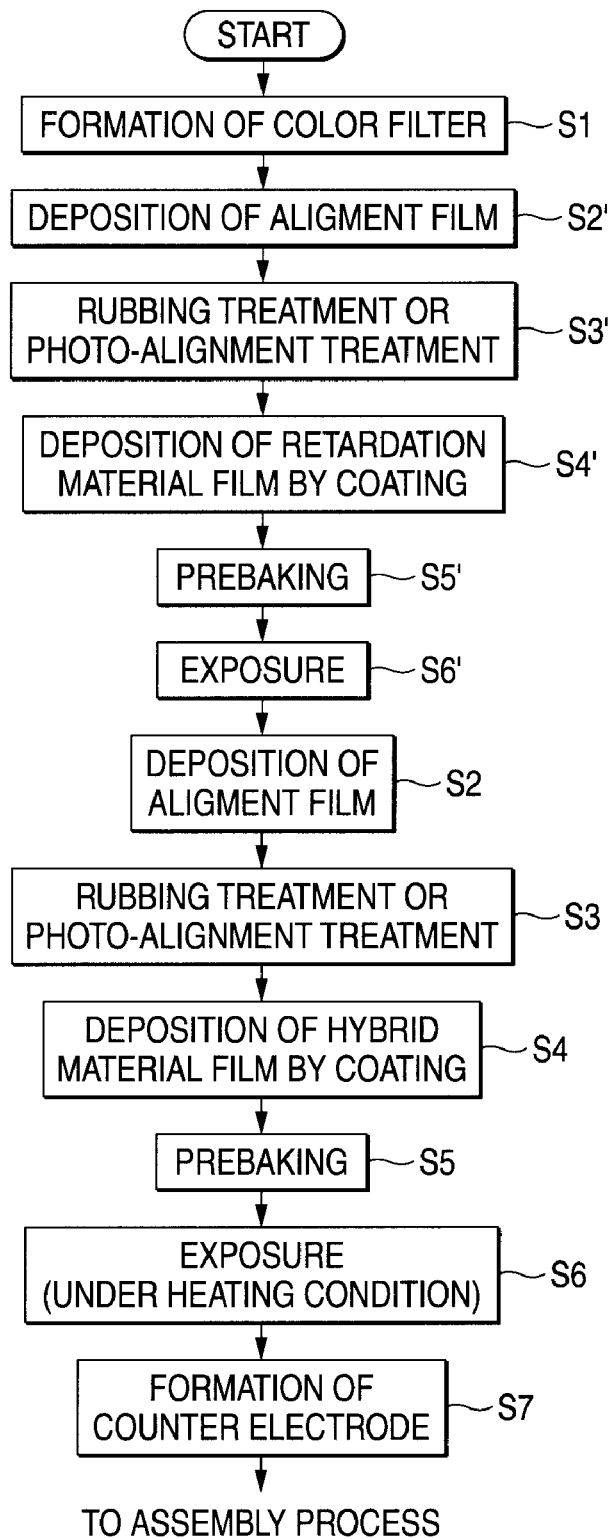
FIG. 8 is a flowchart for explanation of a manufacture of the liquid crystal display device of the third embodiment.

The manufacture of the liquid crystal display device 1e having the above described configuration may be performed in the same procedure as in the past except that the formation of the λ/2 retardation layer 43' and the hybrid retardation layer 23 is performed as at steps S2' to S6' that have been described using FIG. 8 in the third embodiment.

The liquid crystal display device 1e obtained as described above is also capable of high contrast display with a good viewing angle in the liquid crystal display device 1e of ECB mode with the hybrid retardation layer 23 and electronic equipment using the liquid crystal display device 1e as is the case of the first embodiment because the hybrid retardation layer 23 is formed by deposition via the color filter 22 on the transparent substrate 21.

Further, since the hybrid retardation layer 23 and the λ/2 retardation layer 43' are provided at the liquid crystal layer LC side on the transparent substrate 21, in the manufacture of the liquid crystal display device 1e, the hybrid retardation layer 23 and the λ/2 retardation layer 43' are hardly damaged in and after the assembly process in which the drive substrate 10 and the opposing substrate 20 are bonded, and therefore, the deterioration of the display characteristic due to damage in and after the assembly process can be prevented.

Furthermore, since the λ/2 retardation layer 43' is also provided at the liquid crystal layer LC side on the transparent substrate 21, i.e., within the liquid crystal cell, the liquid crystal display device 1e can be made thinner compared to the configuration in which the film-like λ/2 retardation layer is bonded to the outer side of the liquid crystal cell.

In the above described respective embodiments, the configurations in which the invention is applied to each active matrix liquid crystal display device having the pixel electrode 15 and the drive element 12 connected thereto provided at the drive substrate 10 side have been described. However, the invention is similarly applicable to a simple matrix type liquid crystal display device provided with no drive element 12, and the similar effect can be obtained.

Further, in the above described respective embodiments, the configuration in which the backlight 33 is provided as a light source in the transmissive display has been described. However, the light source in the transmissive display may be outside light and it is not necessary to provide the backlight 33 in this case.

EXAMPLES

Working Example 1

Figure 11:
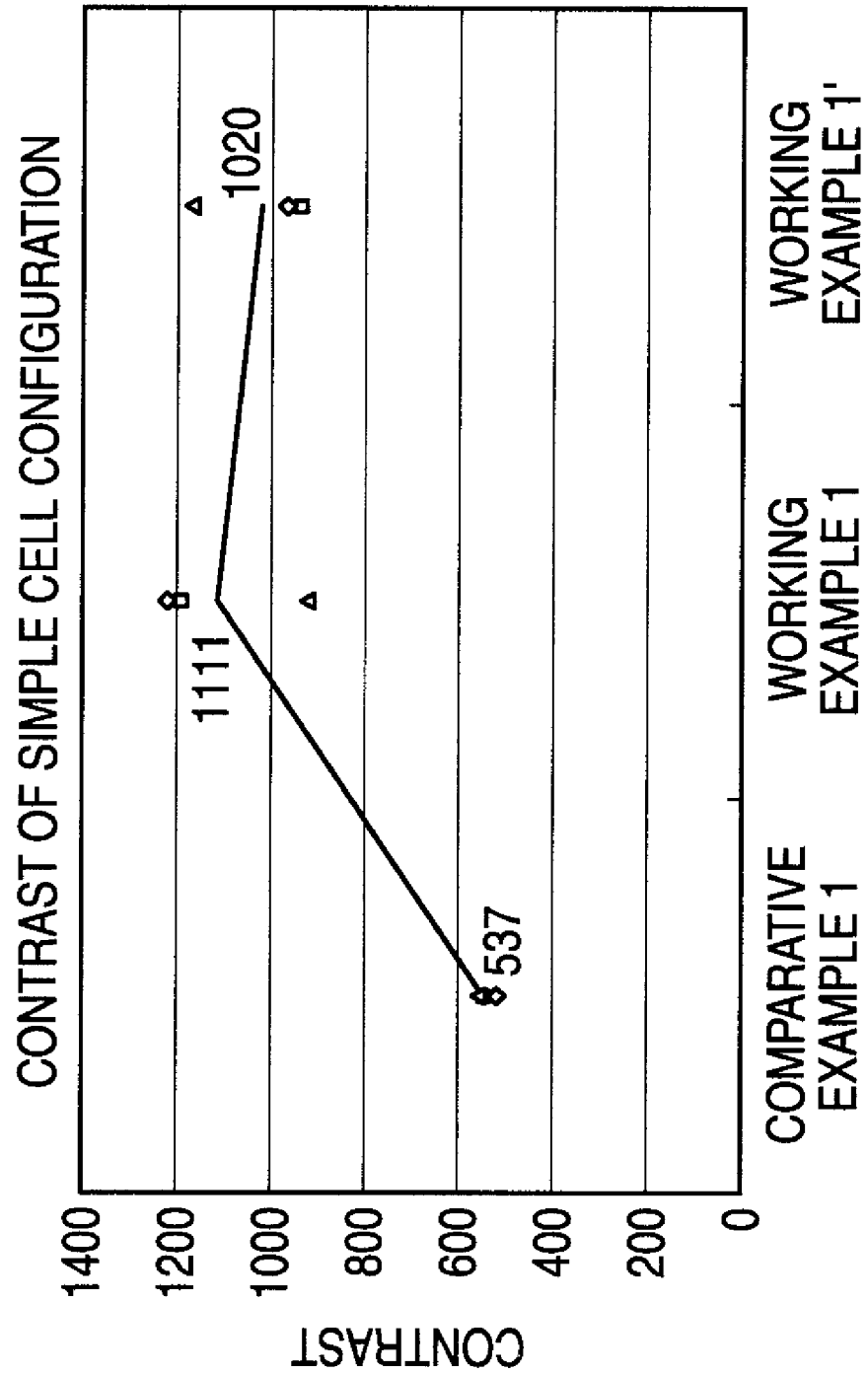
FIG. 11 shows contrasts in liquid crystal display devices of working examples 1, 1' and comparative example 1.

FIG. 11 shows the contrast of transmissive liquid crystal display devices (Working Examples 1, 1') in which a hybrid retardation layer is formed by deposition at the liquid crystal layer side in the transparent substrate as simple configurations with no drive element and the contrast of a transmissive liquid crystal display device (Comparative Example 1) in which a film-like hybrid retardation layer is bonded on the outer side of the transparent substrate. The working examples 1, 1' are the devices having the same configuration and differing in lot.

As shown in FIG. 11, it is confirmed that the contrast in the transmissive liquid crystal display devices of the working examples 1, 1' in which the hybrid retardation layer is formed by deposition at the liquid crystal layer side in the transparent substrate is improved nearly twice the contrast of the transmissive liquid crystal display device of the comparative example 1 in which the film-like hybrid retardation layer is bonded on the outer side of the transparent substrate.

Working Example 2

Figure 12:
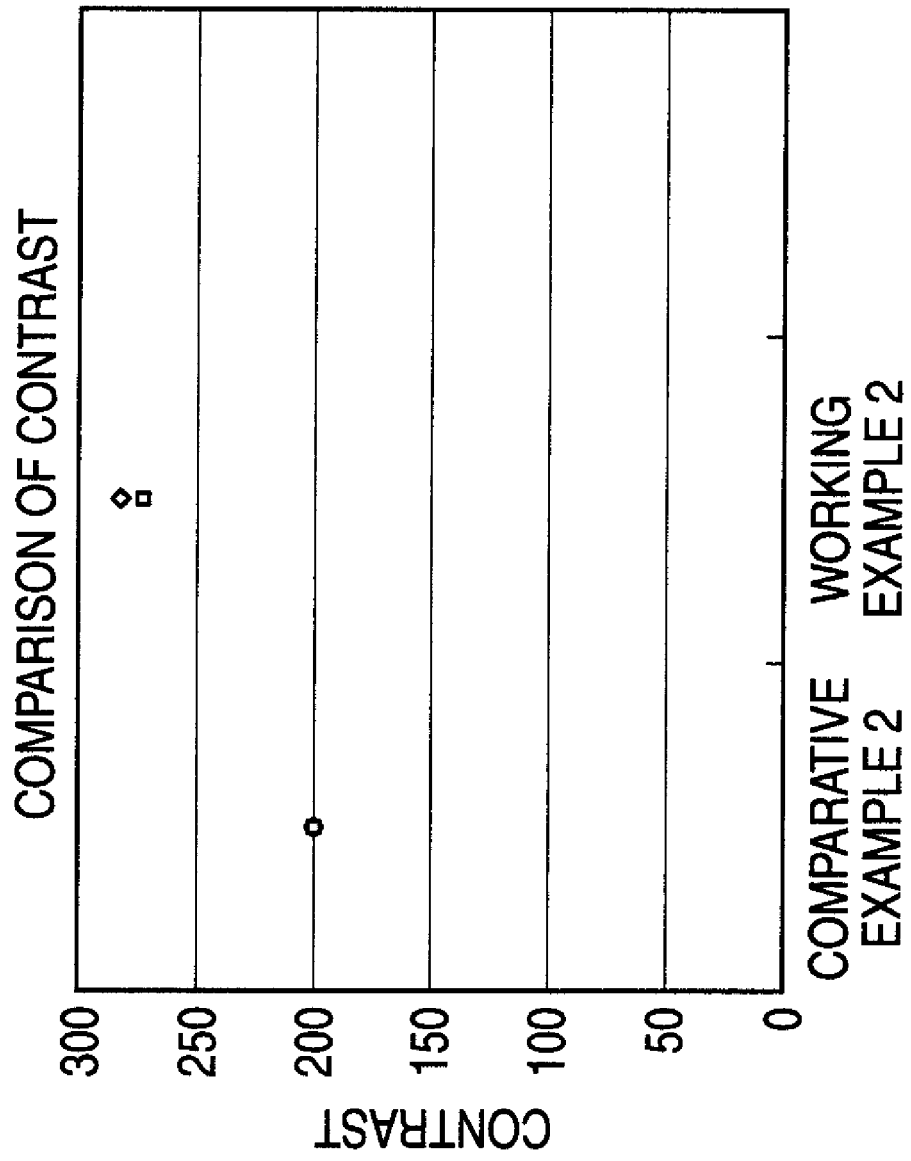
FIG. 12 shows contrasts in liquid crystal display devices of working example 2 and comparative example 2.

FIG. 12 shows the contrast of a transmissive liquid crystal display device (Working Example 2) in which a hybrid retardation layer is formed by deposition at the liquid crystal layer side in the transparent substrate as a active configuration with drive element and the contrast of a transmissive liquid crystal display device (Comparative Example 2) in which a film-like hybrid retardation layer is bonded on the outer side of the transparent substrate.

Further, FIG. 13 shows transmittance at the time of white presentation in the liquid crystal display devices in these working example 2 and comparative example 2.

As shown in FIG. 12, it is confirmed that, even in the case of the active configuration with drive element, the contrast in the transmissive liquid crystal display device of the working example 2 in which the hybrid retardation layer is formed by deposition at the liquid crystal layer side in the transparent substrate is improved nearly 1.4 times the contrast of the transmissive liquid crystal display device of the comparative example 2 in which the film-like hybrid retardation layer is bonded on the outer side of the transparent substrate. Further, from FIG. 13, it is confirmed that the transmittance is maintained at the high value at the same level as in the comparative example 2.

Working Example 3

FIG. 14 shows viewing angle characteristics for a transmissive liquid crystal display device having a configuration in combination of a hybrid retardation layer and a liquid crystal cell of ECB mode. (1) in FIG. 14 shows the viewing angle characteristic of the configuration in which the alignment direction of the hybrid retardation layer and the alignment direction of the liquid crystal layer at the hybrid retardation layer side are set opposite in parallel at 1800. On the other hand, (2) in FIG. 14 shows the viewing angle characteristic of the configuration in which the alignment direction of the hybrid retardation layer and the alignment direction of the liquid crystal layer at the hybrid retardation layer side are set in parallel at 0°. The white lines in the drawing show the contrast 10.

From the comparison, it is confirmed that, in the transmissive liquid crystal display device having a configuration in combination of the hybrid retardation layer and the liquid crystal cell of ECB mode, with the configuration in which the alignment direction of the hybrid retardation layer and the alignment direction of the liquid crystal layer at the hybrid retardation layer side are set opposite in parallel at 180° (FIG. 14(1)), the viewing angle characteristic is drastically improved in comparison with the configuration in which they are set in parallel at 0° (FIG. 14(2)). The good viewing angle characteristic shown in FIG. 14(1) is generally obtained by setting the alignment direction of the hybrid retardation layer and the alignment direction of the liquid crystal layer at the hybrid retardation layer side nearly opposite in parallel at an angle from 150° to 210°.

Working Example 4

(1) in FIG. 15 shows an optical photograph of a hybrid retardation layer formed by deposition on a film base material. On the other hand, (2) in FIG. 15 shows an optical photograph of a hybrid retardation layer formed by deposition on a transparent substrate of glass. From comparison of these optical photographs, it is confirmed that, while an alignment failure occurs and observed as white points in the hybrid retardation layer formed by deposition on the film base material, no white point is observed in the hybrid retardation layer formed by deposition on the transparent substrate of glass in (2) in FIG. 15, and the hybrid retardation layer without alignment failure is formed.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device of electrically controlled birefringence mode, the liquid crystal display device comprising the combination of:
 a liquid crystal cell having a liquid crystal layer sandwiched between a pair of substrates; and
 a hybrid retardation layer in which liquid crystal molecules are hybrid-aligned,
 wherein the hybrid retardation layer is formed by deposition at the liquid crystal layer side on one substrate of the pair of substrates, and
 wherein an alignment direction of the hybrid retardation layer and an alignment direction of the liquid crystal layer at the hybrid retardation layer side form an angle from 150° to 210°.

2. The liquid crystal display device according to claim 1, wherein the liquid crystal molecules that form the hybrid retardation layer have positive refractive anisotropy.

3. The liquid crystal display device according to claim 1, wherein a pixel electrode and a drive element that drives the pixel electrode are provided on the other substrate of the pair of substrates.

4. The liquid crystal display device according to claim 1, wherein a λ/4 retardation layer is provided on an outer side of the liquid crystal cell or between the hybrid retardation layer and the one substrate.

5. The liquid crystal display device according to claim 4, wherein retardation obtained by subtracting retardation of the λ/4 retardation layer from a sum of retardation of the hybrid retardation layer and retardation of the liquid crystal layer in white presentation when no voltage is applied is λ/2, and
 wherein retardation obtained by subtracting retardation of the λ/4 retardation layer from a sum of retardation of the hybrid retardation layer and retardation of the liquid crystal layer in black presentation when a voltage is applied is zero.

6. The liquid crystal display device according to claim 1, wherein a color filter is provided at the liquid crystal layer side of the hybrid retardation layer or between the hybrid retardation layer and the one substrate.

7. The liquid crystal display device according to claim 1, wherein the liquid crystal molecule that forms the hybrid retardation layer has a molecule structure in which acrylate group is bonded to nematic liquid crystal.

8. The liquid crystal display device according to claim 1, wherein the liquid crystal cell has a reflective display region and a transmissive display region with respect to each pixel.

9. A liquid crystal display device, of electrically controlled birefringence mode, the liquid crystal display device comprising:
 a liquid crystal cell having a liquid crystal layer sandwiched between a pair of substrates; and
 a hybrid retardation layer in which liquid crystal molecules are hybrid-aligned,
 wherein the hybrid retardation layer is formed by deposition at the liquid crystal layer side on one substrate of the pair of substrates,
 wherein a λ/4 retardation layer is provided on an outer side of the liquid crystal cell or between the hybrid retardation layer and the one substrate, and
 wherein an alignment axis of the hybrid retardation layer and an optical axis of the λ/4 retardation layer form an angle from 80° to 100°.

10. A liquid crystal display device of electrically controlled birefringence mode, the liquid crystal display device comprising:
 a liquid crystal cell having a liquid crystal layer sandwiched between a pair of substrates; and
 a hybrid retardation layer in which liquid crystal molecules are hybrid-aligned,
 wherein the hybrid retardation layer is formed by deposition at the liquid crystal layer side on one substrate of the pair of substrates,
 wherein a sum of retardation of the hybrid retardation layer and retardation of the liquid crystal layer when no voltage is applied is 3λ/4, and
 wherein a sum of retardation of the hybrid retardation layer and retardation of the liquid crystal layer when a voltage is applied is λ/4.

11. Electronic equipment comprising a liquid crystal display device of electrically controlled birefringence mode including a liquid crystal cell having a liquid crystal layer sandwiched between a pair of substrates and a hybrid retardation layer in which liquid crystal molecules are hybrid-aligned in combination,
 wherein the hybrid retardation layer is formed by deposition at the liquid crystal layer side on one substrate of the pair of substrates, and
 wherein an alignment direction of the hybrid retardation layer and an alignment direction of the liquid crystal layer at the hybrid retardation layer side form an angle from 150° to 210°.

12. A method of manufacturing a liquid crystal display device comprising the steps of:
 forming a hybrid retardation layer in which liquid crystal molecules are hybrid-aligned on a first substrate; and
 filling and sealing a space between the first substrate and a second substrate oppositely provide data formation surface of the hybrid retardation layer on the first substrate with a liquid crystal layer,
 wherein, at the step of forming the hybrid retardation layer by deposition,
 depositing a material film of the hybrid retardation layer using light cure liquid crystal via an alignment film on the first substrate, and
 exposing the material film to light while controlling viewing angle dependency of retardation with heating temperature of the material film, and thereby, forming by deposition the hybrid retardation layer having the material film cured.

13. A method of manufacturing a liquid crystal display device comprising the steps of:
 forming a hybrid retardation layer in which liquid crystal molecules are hybrid-aligned on a first substrate; and
 filling and sealing a space between the first substrate and a second substrate oppositely provided at a formation surface of the hybrid retardation layer on the first substrate with a liquid crystal layer,
 wherein, at the step of forming the hybrid retardation layer by deposition,
 depositing a material film of the hybrid retardation layer using light cure liquid crystal via an alignment film on the first substrate,
 forming by deposition the hybrid retardation layer having the material film cured by exposure to light, removing a surface layer of the hybrid retardation layer to a predetermined thickness, and thereby, controlling viewing angle dependency of retardation in the hybrid retardation layer.

* * * * *